(12) United States Patent
Aparicio, IV

(10) Patent No.: US 8,160,981 B2
(45) Date of Patent: Apr. 17, 2012

(54) EVENT-BASED ANTICIPATION SYSTEMS, METHODS AND COMPUTER PROGRAM PRODUCTS FOR ASSOCIATIVE MEMORIES WHEREIN TIMES OF FUTURE EVENTS OCCURRING ARE PREDICTED

(75) Inventor: Manuel Aparicio, IV, Chapel Hill, NC (US)

(73) Assignee: Saffron Technology, Inc., Morrisville, NC (US)

( * ) Notice: Subject to any disclaimer, the term of this patent is extended or adjusted under 35 U.S.C. 154(b) by 797 days.

(21) Appl. No.: 12/237,624

(22) Filed: Sep. 25, 2008

(65) Prior Publication Data

US 2009/0083207 A1 Mar. 26, 2009

Related U.S. Application Data

(60) Provisional application No. 60/974,860, filed on Sep. 25, 2007.

(51) Int. Cl.
*G06F 17/00* (2006.01)
(52) U.S. Cl. .......................................................... 706/45
(58) Field of Classification Search .................... 706/12, 706/45, 52, 62
See application file for complete search history.

(56) References Cited

U.S. PATENT DOCUMENTS

| | | | | |
|---|---|---|---|---|
| 2005/0163347 | A1* | 7/2005 | Aparicio et al. | 382/103 |
| 2007/0233397 | A1* | 10/2007 | Kim | 702/19 |
| 2007/0239975 | A1* | 10/2007 | Wang | 712/241 |

OTHER PUBLICATIONS

Bertoli et al., Forecasting on Complex Datasets with Association Rules, 2004, Springer-Verlag, pp. 1171-1180.*
Xiang-Bin Yan et al., Research on event prediction in time-series data, 2004, IEEE, pp. 2874-2878.*
See et al., Some Initial Experiments with Neural Network Models of Flood Forecasting on the River Ouse, 1997, Proceedings of GeoComputation, pp. 1-8.*
Nogales et al., Forecasting Next-Day Electricity Prices by Time Series Models, 2002, IEEE, pp. 1-7.*
Zhang et al., Forecasting with artificial neural networks: The state of the art, 1998, Elsevier Science, pp. 1-28.*

* cited by examiner

*Primary Examiner* — David Vincent
(74) *Attorney, Agent, or Firm* — Myers Bigel Sibley & Sajovec

(57) ABSTRACT

A time of occurrence of an interest event of multiple events is anticipated based on time intervals between at least two previously occurring events and a previous occurrence of the interest event and based on a new occurrence of at least one of the events. For a respective event, multiple inter-event interval pairs based on occurrence times of pairs of respective remaining events relative to an occurrence time of the respective event are memorized. For a respective event, a time of future occurrence of the interest event from the respective event is predicted based on the inter-event interval pairs that have been memorized. The predicted time of future occurrence is also based on the new occurrence of the respective event and at least one of the events to obtain multiple interest event predictions of times of future occurrences of the interest event. The predictions are processed to generate an anticipated time when the interest event will occur in the future. A user is presented at least one of the interest event predictions and/or the anticipated time when the interest event will occur in the future.

22 Claims, 12 Drawing Sheets

EVENT-BASED ANTICIPATION SYSTEMS, METHODS AND COMPUTER PROGRAM PRODUCTS FOR ASSOCIATIVE MEMORIES WHEREIN TIMES OF FUTURE EVENTS OCCURRING ARE PREDICTED

CROSS-REFERENCE

This application claims the benefit of provisional Application No. 60/974,860, filed Sep. 25, 2007, entitled Associative Memory Operators For Event-Based Anticipation, assigned to the assignee of the present invention, the disclosure of which is hereby incorporated herein by reference in its entirety as if set forth fully herein.

FIELD OF THE INVENTION

This invention relates to artificial intelligence systems, methods and computer program products, and more particularly to associative memory systems, methods and computer program products.

BACKGROUND OF THE INVENTION

Associative memories, also referred to as content addressable memories, are widely used in the fields of pattern matching and identification, expert systems and artificial intelligence. A widely used associative memory is the Hopfield artificial neural network. Hopfield artificial neural networks are described, for example, in U.S. Pat. No. 4,660,166 to Hopfield entitled Electronic Network for Collective Decision Based on Large Number of Connections Between Signals.

Associative memories are also described in U.S. Pat. No. 6,581,049 to coinventor Aparicio, IV et al., entitled Artificial Neurons Including Power Series of Weights and Counts That Represent Prior and Next Association, assigned to the assignee of the present application, the disclosure of which is hereby incorporated herein by reference in its entirety as if set forth fully herein. As described in the Abstract of the '049 patent, an artificial neuron includes inputs and dendrites, a respective one of which is associated with a respective one of the inputs. Each dendrite includes a power series of weights, and each weight in a power series includes an associated count for the associated power. The power series of weights preferably is a base-two power series of weights, each weight in the base-two power series including an associated count that represents a bit position. The counts for the associated power preferably are statistical counts. More particularly, the dendrites preferably are sequentially ordered, and the power series of weights preferably includes a pair of first and second power series of weights. Each weight in the first power series includes a first count that is a function of associations of prior dendrites, and each weight of the second power series includes a second count that is a function of associations of next dendrites. More preferably, a first and second power series of weights is provided for each of multiple observation phases. In order to propagate an input signal into the artificial neuron, a trace preferably also is provided that is responsive to an input signal at the associated input. The trace preferably includes a first trace count that is a function of associations of the input signal at prior dendrites, and a second trace count that is a function of associations of the input signal at next dendrites. The first and second power series are responsive to the respective first and second trace counts. The input signal preferably is converted into the first and second trace counts, and a trace wave propagator propagates the respective first and second trace counts into the respective first and second power series of weights.

The last several years of intelligence analysis have seen the shift from search to discovery. Beyond keyword search engines and relational database queries, methods for entity and relationship modeling have emerged to uncover relevant sub-networks of people, places, and things. See, for example, U.S. Patent Application Publication No. 2006/0095653 A1, published May 4, 2006, entitled "Network of Networks of Associative Memory Networks for Knowledge Management" and U.S. Patent Application Publication No. 2005/0163347 A1, published Jul. 28, 2005, entitled "Distance-Based Spatial Representation and Prediction Systems, Methods and Computer Program Products for Associative Memories." However, challenges related to identification of temporal causality within data may be significant.

SUMMARY OF THE INVENTION

The present invention includes methods of anticipating a time of occurrence of an interest event of multiple events based on time intervals between at least two previously occurring of the events and a previous occurrence of the interest event and based on a new occurrence of at least one of the events. In some embodiments, the methods include, for a respective event, memorizing multiple inter-event interval pairs based on occurrence times of pairs of respective remaining events relative to an occurrence time of the respective event. Some embodiments include, for a respective event, predicting a time of future occurrence of the interest event from the respective event based on the inter-event interval pairs that have been memorized and based on the new occurrence of the respective event and at least one of the events to obtain multiple interest event predictions of times of future occurrences of the interest event.

Some embodiments of the methods may include processing the predictions to generate an anticipated time when the interest event will occur in the future and presenting, to a user, at least one of the interest event predictions and/or the anticipated time when the interest event will occur in the future.

In some embodiments, memorizing the inter-event interval pairs includes memorizing multiple triple associations between the respective event and respective pairs of remaining events. Some embodiments provide that respective ones of the triple associations include an association that the respective event occurred a first inter-event interval from a first event when the respective event occurred a second inter-event interval from a second event.

Some embodiments provide that predicting a time of future occurrence of the interest event from the respective event includes generating a predicted inter-event interval between the respective event and the future occurrence of the interest event based on ones of the inter-event interval pairs corresponding to the respective event and the at least one of the events that were memorized in a respective associative memory for the respective event. Some embodiments may further include generating a confidence value that corresponds to the predicted inter-event interval and that is based on an experience value corresponding to the inter-event interval pairs that have been memorized.

In some embodiments, generating the confidence value includes comparing a range that is based on the memorized inter-event interval corresponding to the respective event and the at least one of the events with a value of a new inter-event interval corresponding to the new occurrence of the respective event and the new occurrence of the at least one of the events.

Some embodiments provide that generating the confidence value includes dividing the new inter-event interval by the range that is based on the memorized inter-event interval corresponding to the respective event and the at least one of the events. Such embodiments may provide that if a result of the dividing is greater than 1, a reciprocal of the result is generated to generate the confidence value.

In some embodiments, the range includes a first endpoint that corresponds to the greatest absolute value of the either the memorized inter-event interval corresponding to the respective event and the at least one of the events or the new inter-event interval. Some embodiments provide that the range includes a second endpoint that is zero if both of the memorized inter-event intervals corresponding to the respective event and the at least one of the events or the new inter-event interval are either positive numbers or negative values and the range includes the second endpoint that is the other of the memorized inter-event interval corresponding to the respective event and the at least one of the events or the new inter-event interval if only one of the memorized inter-event interval corresponding to the respective event and the at least one event or the new inter-event interval are a positive or negative value.

In some embodiments, memorizing the inter-event interval pairs based on the occurrence times of pairs of respective remaining events relative to the occurrence time of the respective event is performed by a respective associative memory for the respective event.

Some embodiments provide that processing the predictions to generate the anticipated time when the interest event will occur in the future includes summing ones of the confidence values corresponding to the predictions at each of the times of future occurrence.

Some embodiments may include a computer program product that includes a computer usable storage medium having computer-readable program code embodied in the medium, the computer-readable program code configured to perform the methods and systems described herein. Some embodiments may include a system that includes means for performing the methods described herein.

Some embodiments of the present invention include systems for anticipating a time of future occurrence of an interest event of multiple events. Some embodiments of such systems may include multiple associative memories, a respective one of which is configured to memorize multiple triple associations between a respective event and at least one of a previously occurring event. Some embodiments provide that the systems include a respective associative memory that is also configured to predict a time of future occurrence of the interest event relative to the respective event based on the memorized triple associations and a new occurrence of at least one of the events. In some embodiments, an anticipation module that is operable to anticipate when the interest event will occur by processing multiple predicted times of future occurrence of the interest event corresponding to the associative memories may be provided. Some embodiments include an output generator that is operable to generate an output for a user that corresponds to an anticipated time when the interest event will occur in the future.

In some embodiments, a respective associative memory is configured to memorize the triple associations between a respective event and at least one of a previously occurring event by memorizing each time a first event having a first inter-event interval from the respective event occurs when a second event having a second inter-event interval from the respective event occurs.

Some embodiments provide that a respective associative memory is configured to predict a time of future occurrence of the interest event relative to the respective event by generating a predicted inter-event interval between the respective event and the future occurrence of the interest event and by generating a confidence value that corresponds to the predicted inter-event interval and that is based on an experience value corresponding to the triple associations that have been memorized.

In some embodiments, a respective associative memory is configured to generate the confidence value by comparing a first inter-event interval between the respective event and the at least one of the previously occurring events and a second inter-event interval between the respective event and the new occurrence of one of the events.

Some embodiments provide that the anticipation module is further operable to combine respective ones of the predicted times of future events that are predicted to occur in the same time interval by aggregating the confidence values thereof.

The present invention includes methods for anticipating a time of future occurrence of an interest event that is one of multiple events. Some embodiments of such methods include configuring a respective one of multiple associative memories to memorize multiple triple associations between a respective event and at least two previously occurring events. Some embodiments include configuring a respective one of the associative memories to predict a time of future occurrence of the interest event relative to the respective event based on the memorized triple associations and a new occurrence of at least one of the events.

In some embodiments, such methods include anticipating when the interest event will occur by processing multiple predicted times of future occurrence of the interest event corresponding to the associative memories and presenting, to a user, an anticipated time when the interest event will occur in the future.

Some embodiments provide that a respective one of the triple associations includes an association that the respective event occurred a first inter-event interval from a first event when the respective event occurred a second inter-event interval from a second event.

In some embodiments, configuring a respective one of the associative memories to predict a time of future occurrence of the interest event relative to the respective event includes configuring a respective one of the associative memories to generate a predicted inter-event interval between the respective event and the future occurrence of the interest event based on ones of the triple associations corresponding to the respective event and the at least one of the events that were memorized in a respective associative memory for the respective event and to generate a confidence value that corresponds to the predicted inter-event interval and that is based on an experience value corresponding to the triple associations that have been memorized.

Some embodiments provide that anticipating when the interest event will occur by processing the predicted times of future occurrence of the interest event corresponding to the associative memories includes sorting the predicted times of future occurrence of the interest event according to future time intervals and summing multiple confidence values corresponding to respective ones of the predicted times of future occurrence within each of the predicted time intervals.

DETAILED DESCRIPTION

Figure 1:
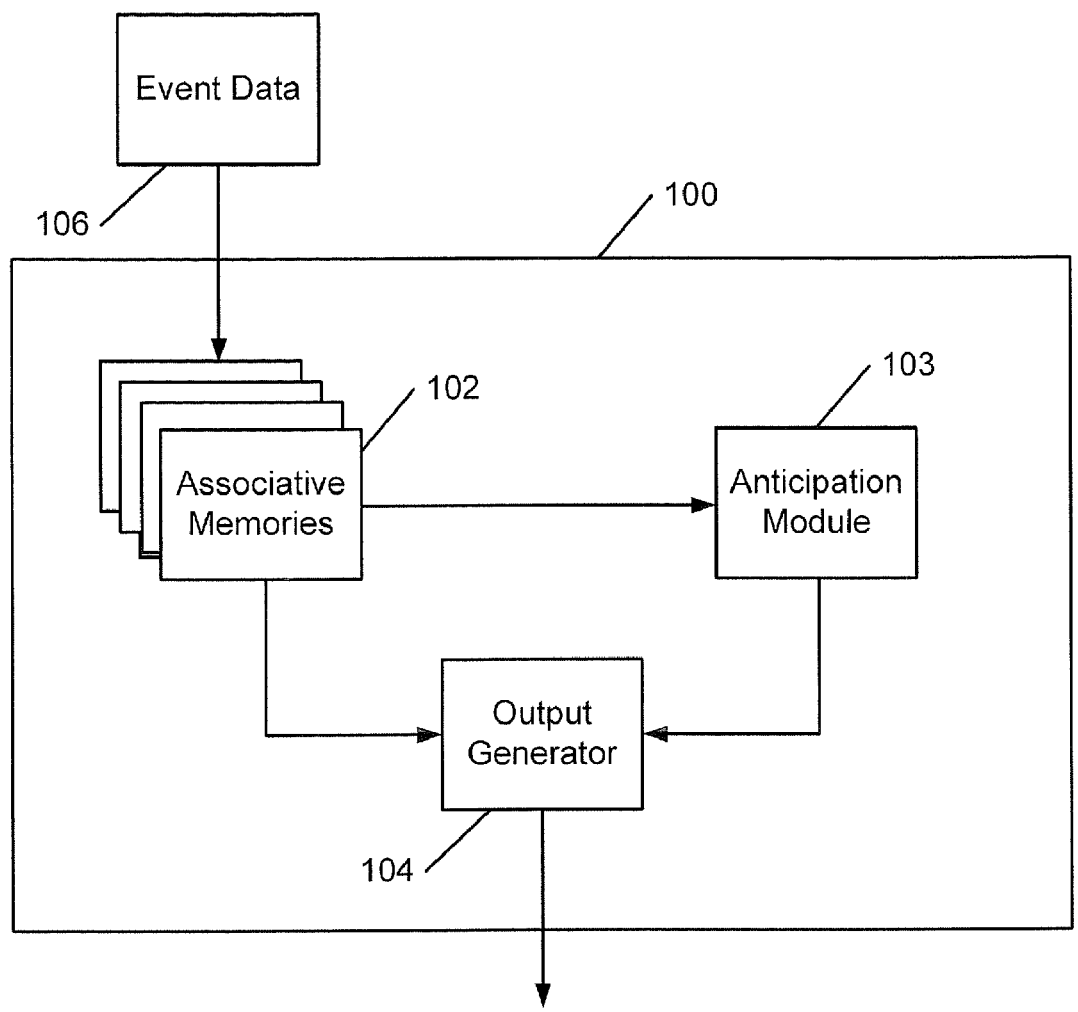
FIG. 1 is a block diagram of a system for anticipating a time of future occurrence of an interest event according to some embodiments of the invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As a shift from search to discovery proceeds, some embodiments of the invention can use entity networks to represent massive data sources and to represent temporal causality of event sequences within these sources. In this regard, some embodiments of the invention can provide associative memory-based prediction of events, including the complex dependencies that relate one event to another event. In the context of other events. Further, some embodiments may include a control system for prediction that provides recursive estimation and includes feedback that may control real-time error correction.

An event name may represent an event type that may be classified according to the conditions and/or context under which the event occurs. For example, an event may define: a meeting of two or more specific individuals and/or two or more individuals associated with specific groups or organizations; the presence of an individual and/or member of a group and/or organization in a specific place and/or type of place; an activity of one or more individuals from one or more organizations and/or groups; a naturally occurring event, such as, for example, a weather condition and/or pattern; the occurrence of a specific indicator and/or identifier reaching a predefined level, threshold and/or value; and/or a communication that is specific to a person, group and/or topic, among others. In short, an event may be defined using virtually any combination of criteria that can be identified as having reasonably occurred. For example, an event definition that is overly narrow may result in little data and/or an occurrence that may be difficult to identify. Similarly, an event definition that is overly broad may result in an large quantity of data, much of which may be of little informational content or value in the context of temporal causality.

Given a set of events and their inter-event intervals, prediction will suggest a future time of any missing but likely relevant events and their likely times of occurrence. Temporal prediction, by definition, incorporates temporal dependence. This dependence (the correlational structure between events and timestamps) is captured by an associative memory. In some embodiments, the associative memory may be embodied as was described in U.S. Pat. No. 6,581,049, U.S. Pat. No. 7,016,886, U.S. Pat. No. 7,333,917, U.S. Published Patent Application 2008/0097945, U.S. Published Patent Application 2007/0299797, U.S. Published Patent Application 2007/0033346 and/or U.S. Published Patent Application 2003/0033265. However, in other embodiments, other conventional associative memories may be used. In some embodiments, because each event might be of a different type, each event and/or type may be represented by a different associative memory and/or agent. Beyond single matrix variograms, a respective agent can represent a respective variable among many variables. Each agent may contain a matrix of multi-variable inter-event intervals observed around it.

Such a multi-variable predictive system can utilize the extra computational power of a network of associative memories or agents. Each agent contains one level of the network: a multi-typed associative matrix. The agents together constitute another level of the network: how the agents interact and cohere. Unlike single-matrix single-variable variograms, some embodiments of the invention can represent triple associations, which may be variograms that can store the correlational structure between pairs of points in the context of the associative memory or agent. Thus, an agent can store the correlational structure between pairs of points relative to the point of the agent as a reference. In other words, each agent can represent the particular perspective of each event type, learning about the correlation structures between other events around its own occurrences.

Reference is now made to FIG. 1, which is a block diagram of a system/method/computer program products 100 for anticipating a time of future occurrence of an interest event according to some embodiments of the invention. The system/method/computer program product 100 may include multiple associative memories 102 that are configured to memorize associations between events as provided in event data 106. In some embodiments, the event data may be provided as an event identifier and/or label and may include a corresponding timestamp. For example, event data may be provided as coordinate pairs including the event type and timestamp such as $\{(E_A, T_A), (E_B, T_B) \ldots (E_N, T_N)\}$ where $E_A$ is event A and $T_A$ is a timestamp corresponding to the time at which event A occurred.

Some embodiments provide that the timestamp is expressed in terms of absolute time. In some embodiments, time may be expressed and recorded in terms of specific time intervals. In some embodiments, the duration or size of such time intervals may be determined based on the frequency in which the events being observed and/or imagined occur. The time intervals may be identified relative to a fixed point in time and/or an identified time interval, either future or past. In this regard, the event data may be expressed and/or converted to include time interval information such as, for example, $\{(E_A, -7), (E_B, -4) \ldots (E_N, 0)\}$ where $E_N$ is the reference and/or present event and $E_A$ occurred seven time intervals prior to $E_N$.

In some embodiments, the associative memories 102 memorize the event data 106 in terms of triple associations. For example, a triple association in an associative memory that corresponds to a specific event may memorize the association that a first event occurred a first interval from the specific event when a second event occurred a second interval from the specific event. The first and second intervals between the specific event and the first and second events, respectively may be referred to as first and second inter-event intervals. In some embodiments, the associative memory memorizes the triple association by incrementing an experience value corresponding to the first event/first inter-event interval and second event/second inter-event interval association. The computation power in representing triple associations allows the system to learn about inter-event intervals, not just about mere co-existence within a specified continuous time frame.

Associative memories 102 may also be configured to predict a time of future occurrence of an interest event relative to the specific event based on the memorized triple associations and a new occurrence of a previously occurring event. Some embodiments provide that the associative memory 102 generates a predicted inter-event interval between the specific event and the interest event. In some embodiments, the associative memory 102 generates a confidence value that corresponds to the predicted inter-event interval and that is based on one or more experience values in the associative memory 102 that correspond to the triple associations that have been memorized.

The confidence value may be generated by comparing inter-event intervals between the specific event and respective ones of one of the memorized events and the interest event. In this manner, where an inter-event interval corresponding to the new occurrence of the previously occurring event is different from that of the memorized inter-event intervals, the confidence value of the predicted inter-event interval may be diminished.

The predicted inter-event intervals or times provided by respective ones of the associative memories may be processed by an anticipation module 103 that is configured to anticipate when the interest event will occur in the future. In some embodiments, each of the predictions for a specific time interval may be combined by, for example, aggregating the confidence values for each of the different time intervals in which the interest event is predicted to occur. In this regard, an anticipation may include processed data corresponding to multiple predictions provided by multiple associative memories.

An output generator 104 may be configured to generate an output for a user that corresponds to the anticipated time at which the interest event will occur, including any confidence values. In some embodiments, the output generator 104 may be operable to output the predictions from the associative memories 102 instead of or in addition to the anticipated time.

Figure 2:
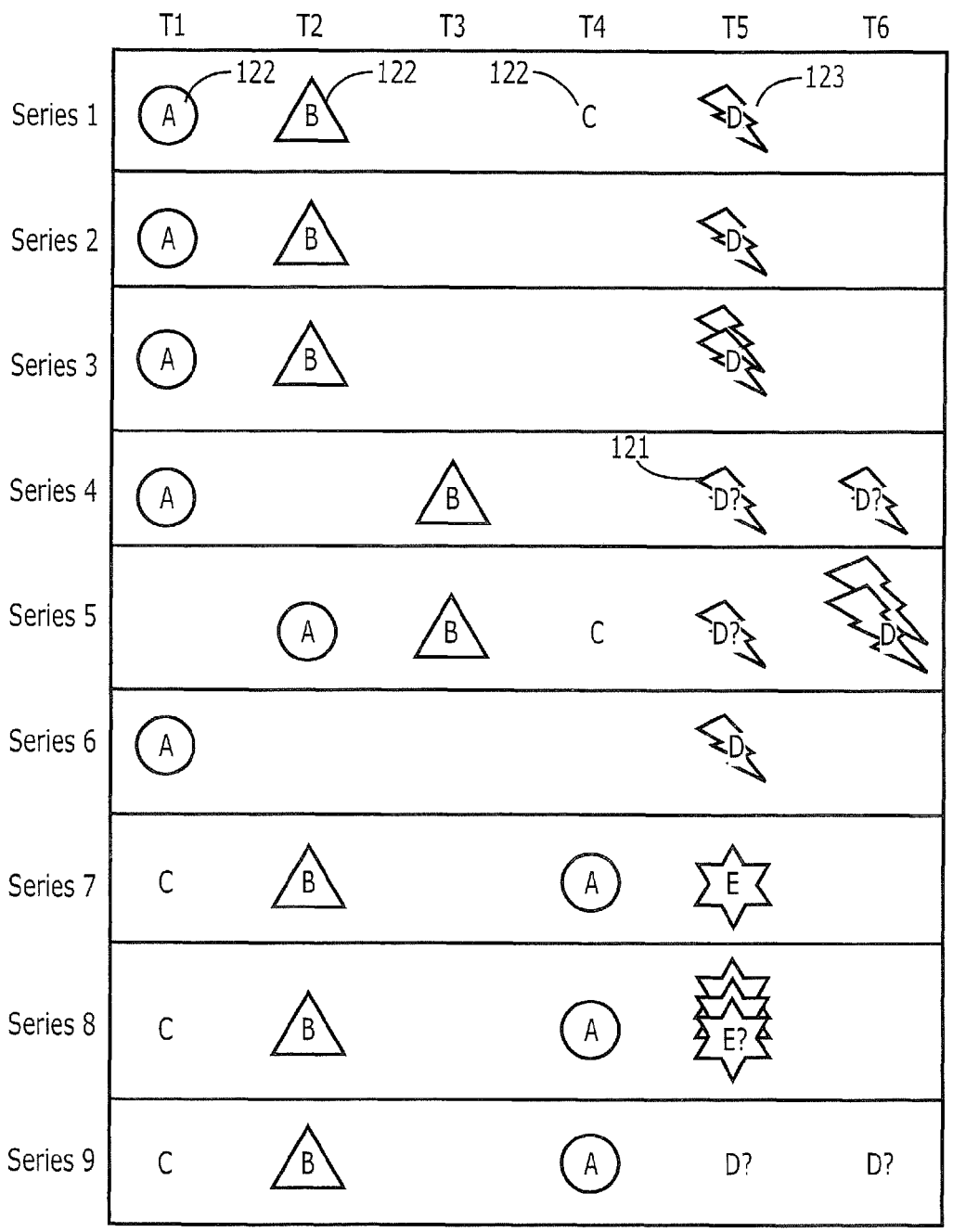
FIG. 2 is a chart illustrating multiple event sequences that may be used to explain exemplary embodiments of the invention.

Reference is now made to FIG. 2, which is a chart illustrating multiple event series that may be used in FIGS. 3-11 to explain exemplary embodiments of the invention. The chart provides that different types of events 122 may occur in varying time intervals and/or sequences T1-T6 relative to one another. For example, Series 1 illustrates that event A occurs at time interval T1, event B occurs at time interval T2, and event C occurs at time interval T4. Further, the series includes event D, which is an interest event 123 occurring at time interval T5. Although discussed herein in terms of events, the discussion of event A may be read to include a variety of event definitions including that event A may be an event that is a type A event.

Figure 3:
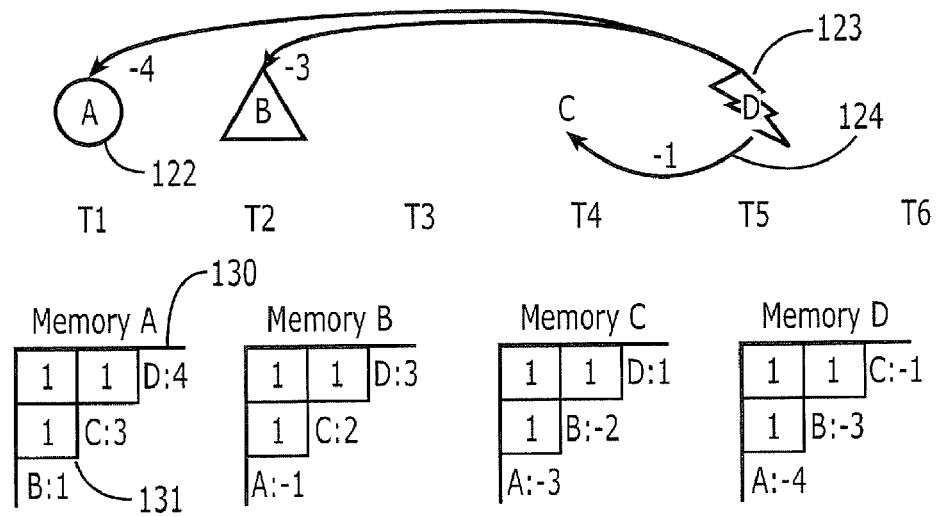
FIGS. 3-4 illustrate observations of events and inter-event intervals corresponding to Series 1 and 2 of FIG. 2 according to exemplary embodiments of the invention.
Figure 4:
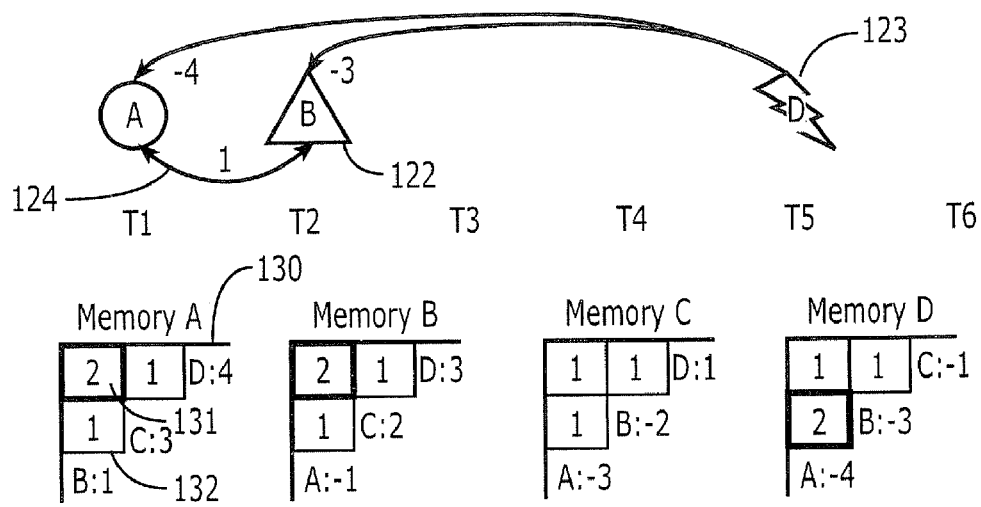

Reference is now made to FIGS. 3-4, which illustrate observations of events and inter-event intervals corresponding to Series 1 and 2 of FIG. 2 according to exemplary embodiments of the invention. Referring to FIG. 3, note that an associative memory 130 is provided for each event (and/or event type) 122. Thus, respective associative memories 130 corresponding to events A, B, C and D 122 are provided and updated during the observation operation. Note that event D is identified as an interest event 123 for the purposes of discussion of the examples herein and may be otherwise just an event among the other events.

The associative memories 130 may include an associative matrix to represent the event:inter-event interval to event: inter-event interval co-incidences. The matrices presented in FIG. 3 represent only the single set of observations corresponding to Series 1; all the co-incidence counts are '1'. As subsequent observations are made, the co-incidence counts may be incremented and may represent experience values 131 of the associative memory. However, such matrices may generally store a very large number of other event series to represent virtually any number of events:inter-event intervals and their corresponding experience values 131.

Accordingly, each of the associative memories 130 may memorize the observation in terms of the triple association of the inter-event intervals between the respective event and each of the other events in the series by creating or incrementing the experience value 131 corresponding to that triple association. By way of illustration, each experience value 131 in an associative memory that is updated, modified and/or accessed as a result of the illustrated operation is identified using a bold border relative to the borders of other experience values 131 in the associative matrix illustration. For example, all three experience values 131 of associative memory A are updated via an observation corresponding to Series 1.

Referring to associative memory A, the top left element (experience value 131) is incremented to a value of 1 to reflect the memorization that event B occurred 1 time interval (B:1) after event A when event D occurred 4 time intervals (D:4) after event A. Similarly, the bottom element (experience value 131) is incremented to a value of 1 to reflect the memorization that event B occurred 1 time interval (B:1) after event A when event C occurred 3 time intervals (C:3) after event A. The experience value corresponding to the triple association between events A, C and D is similarly incremented during this observe operation.

Each associative memory 130 corresponding to each of events A, B, C, and D observes the series and the corresponding inter-event intervals from its own perspective. For example, memory B memorizes the triple associations regarding event A occurring one time interval before event B. In this regard, the experience values are incremented to a value of 1 to reflect the memorization that event A occurred one time interval (A:−1) before event B when event C occurred two time intervals (C:2) after event B and when event D occurred three time intervals (D:3) after event B. As an inter-event interval is the number of time intervals between respective events, the inter-event interval value captures the duration and sequence of respective events. Similarly, associative memories C and D are operable to memorize the events and inter-event intervals from their own respective time intervals.

Referring to FIG. 4, an observation operation corresponding to Series 2 of FIG. 2 is memorized by the associative memories 130. Note that since Series 2 does not include an event C, the memorizations are directed to the experience values corresponding to events A, B and D. For example, the experience value 131 in associative memory A that is incremented is the experience value corresponding to (B:1)/(D:4), as indicated by the bolded borders of that element in the figure. Since Series 2 represents the second occurrence of event B being one time interval after event A (B:1) when event D is four time intervals after event A (D:4), the corresponding experience value in memory A is incremented to a value of 2. Similarly, associative memories B and D memorize the inter-event intervals corresponding to the triple association as well.

Figure 5:
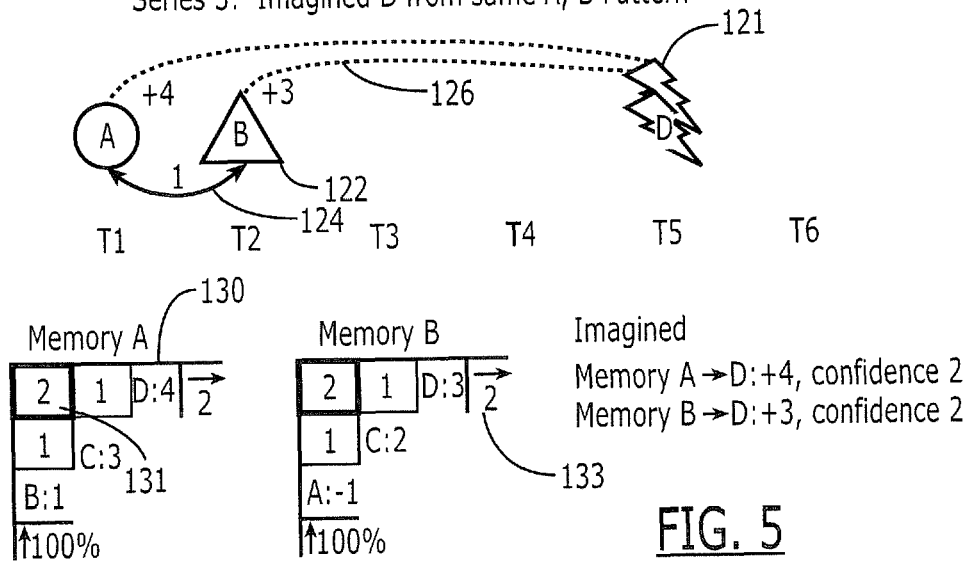
FIGS. 5-7 illustrate imagine operations regarding events and inter-event intervals corresponding to Series 3-5 of FIG. 2 according to exemplary embodiments of the invention.
Figure 6:
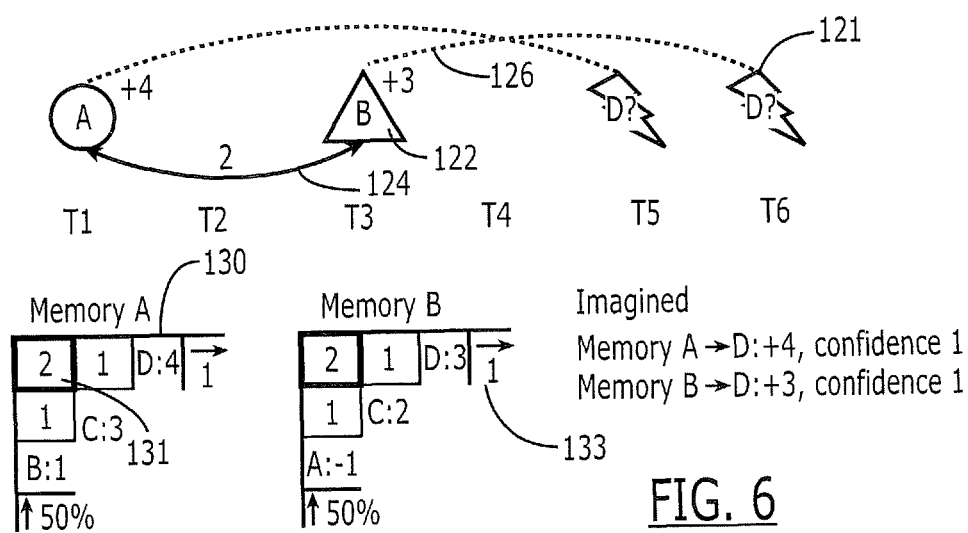
Figure 7:
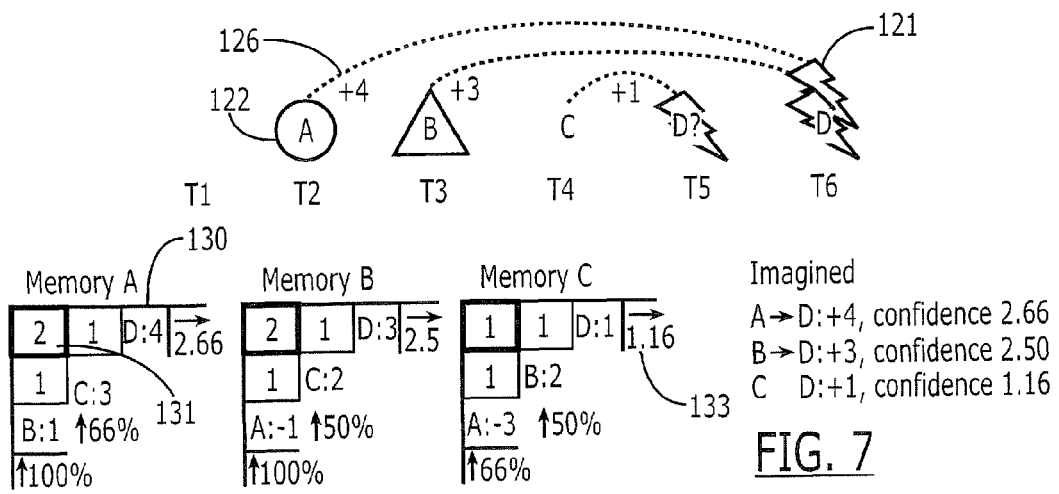
Figure 8:
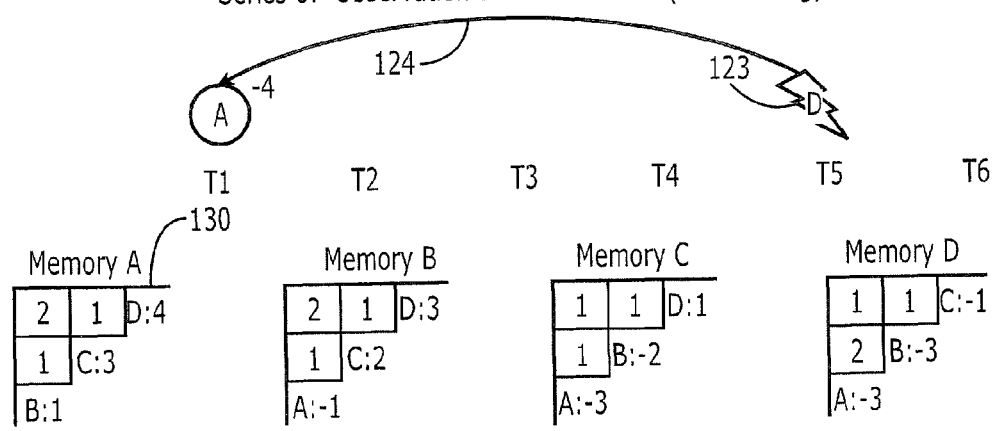
FIG. 8 illustrates observations of events and inter-event intervals without a context corresponding to Series 6 of FIG. 2 according to exemplary embodiments of the invention.

Reference is now made to FIGS. 5-7, which illustrate imagine operations regarding events and inter-event intervals corresponding to Series 3-5, respectively, of FIG. 2 according to exemplary embodiments of the invention. Referring to FIG. 5, Series 3 depicts that events A and B have occurred. In response thereto, each of memory A and B perform an imagine operation to predict when a future event D (predicted interest event 121) will occur. Each of the associative memories A and B provide a predicted inter-event interval and a confidence value 133 corresponding to that predicted inter-event interval.

The associative memory A includes an experience value 131 corresponding to an association between event B and event D. More specifically, associative memory A previously observed that event D occurred four time intervals after event A when event B occurred one time interval after event A. In this regard, associative memory A provides a prediction that a future event D will occur four time intervals after event A. Thus, a predicted inter-event interval 126 between the new occurrence of event A and a future occurrence of event D is four time intervals.

Regarding the confidence of a prediction of future event D from associative memory A, an inter-event interval between event A and event B is positive 1 since the new occurrence of event B is one time interval after the new occurrence of event A. In this example, the associative memory A has previously observed the same inter-event interval between events A and B as the new occurrence of events A and B. Accordingly, a full weight of the experience value 131 corresponding to the triple association between events A, B, and a D is provided as a confidence value 133. Thus, associative memory A predicts that future event D will occur four time intervals after the occurrence of event A, or at time interval T5, with a confidence value 133 of 2.

Associative memory B performs a similar imagine operation. For example, associative memory B previously observed that event D occurred three time intervals after event B when event A occurred one time interval before event B. In this regard, associative memory B provides a prediction that a future event D will occur three time intervals after event B. In this regard, associative memory B provides a prediction that a future event D will occur three time intervals after event B. Thus, a predicted inter-event interval 126 between the new occurrence of event B and a future occurrence of event D is three time intervals, or at time interval T5.

Regarding the confidence of a prediction of future event D from associative memory B, an inter-event interval between event A and event B is negative 1 since the new occurrence of event A is one time interval before the new occurrence of event B. In this example, the associative memory B has previously observed the same inter-event interval between events A and B as that of the new occurrence of events A and B. Accordingly, a full weight of the experience value 131 corresponding to the triple association between events A, B, and a D is provided as a confidence value 133. Thus, associative memory B predicts that future event D will occur three time intervals after the occurrence of event B, or at time interval T5, with a confidence value 133 of 2.

The solution may become less clear when the new event series does not exactly match the original event series. For example, FIG. 6 illustrates how the predictions disperse to the degree that the given series is perturbed. New series of events, even of the same class, are likely to vary from those observed before. As the inter-event intervals are similar but vary from past memories, the predicted inter-event intervals will also disperse. In general, a new event series might be partially coherent, with many or most of the predicted inter-event intervals in cluster, even if some points are outliers. By randomly moving events A, B, and C, the predictions no longer have a single common time interval, but they are still proximal to each other. This demonstrates a generalization that when given event series that have never been seen before exactly, the memories will still try to imagine any relevant predicted future occurrences of an interest event by its inter-event interval and corresponding confidence value. The predictions will be singular and coherent to the degree that the pattern is similar to any past patterns, and will generalize gracefully to the degree it is not. Such singularity or dispersion can be viewed as a degree of confidence in the prediction. An associative memory can explicitly provide likelihood and confidence metrics.

Reference is now made to FIG. 6, which illustrates an imagine operation corresponding to Series 4 of FIG. 2. In contrast with the new occurrence of events A and B in Series 3, as discussed above regarding FIG. 5, the inter-event interval between the new occurrence of events A and B in Series 4 is different from that of the previously observed inter-event interval between events A and B. In this regard, imagine operations generate predictions and confidence values 133 from associative memories A and B that are distinguishable from those generated by the imagine operations described in FIG. 5.

The associative memory A includes experience value 131 corresponding to an association between event B and event D. More specifically, associative memory A previously observed that event D occurred four time intervals after event A when event B occurred one time interval after event A. In this regard, associative memory A provides a prediction that a future event D will occur four time intervals after event A. Thus, a predicted inter-event interval 126 between the new occurrence of event A and a future occurrence of event D is four time intervals, or at time interval T5.

Regarding the confidence of a prediction of future event D from associative memory A, a new inter-event interval 124 between event A and event B is +2 since the new occurrence of event B is two time intervals after the new occurrence of event A. In this example, the associative memory A has previously observed that the inter-event interval between events A and B was +1, which is different from the inter-event interval 124 of the new occurrences of events A and B. Accordingly, the confidence value 133 of the prediction is adjusted to reflect the difference between the memorized inter-event interval and the new inter-event interval 124.

In some embodiments, the confidence value 133 may be adjusted by providing a linear approximation that is based on a discount factor that may be determined by a ratio of the observed inter-event interval as memorized in the associative memory and the new inter-event interval 124. For example, the observed inter-event interval between events A and B memorized in associate memory A is 1 and the new inter-event interval 124 between the new occurrences of events A and B is 2. Some embodiments provide that the fractional value corresponding to the ratio of the observed inter-event interval (1) and the new inter-event interval 124 (2) is 0.50 and represents the discount factor. Accordingly, some embodiments provide that the ratio is determined by dividing the observed inter-event interval by the new inter-event interval. In some embodiments, if the ratio is greater than one, the reciprocal of the ratio be generated to provide a discount value in a range between 0 and 1. In some embodiments, the calculation of the discount factor may use non-linear interpolation approaches as well, including, for example, statistical methods and/or fuzzy scalar approximations, among others.

The discount factor of 0.50, also expressed in FIG. 6 as 50%, is applied as an input to associative memory A regarding the experience value 131 corresponding to event B. Thus, instead of the experience value 131 (2) being provided at full value as a confidence value 133, the experience value 131 is discounted by 50% to generate a confidence value of 1 corresponding to the triple association between events A, B and D. Thus, associative memory A predicts that future event D will occur four time intervals after the occurrence of event A, or at time interval T5, with a confidence value 133 of 1.

Associative memory B performs similar imagine operations as those described above regarding associative memory A and predicts that future event D will occur three time intervals after event B. For example, since the observed inter-event interval and the new inter-event interval 124 are the same as those discussed above regarding associative memory A, the discount value is 50%, and thus the confidence value 133 is 1, which is 50% of the corresponding experience value 131. Thus, associative memory B predicts that future event D will occur three time intervals after the occurrence of event B, or at time interval T6, with a confidence value 133 of 1. Note that, in contrast with the imagine operation corresponding to Series 3, as discussed above regarding FIG. 5, the predictions from the associative memories in the Series 4 imagine operations provide different predicted time intervals in which future event D will occur and provide these predictions with lower confidence values 133.

Reference is now made to FIG. 7, which illustrates an imagine operation corresponding to Series 5 of FIG. 2. The associative memory A includes experience values 131 corresponding to associations between events B and D and between events C and D. More specifically, associative memory A previously observed that event D occurred four time intervals after event A when event B occurred one time interval after event A and when event C occurred three time intervals after event A. In this regard, associative memory A provides a prediction that a future event D will occur four time intervals after event A. Thus, a predicted inter-event interval 126 between the new occurrence of event A and a future occurrence of event D is four time intervals, or at time interval T6.

Regarding the confidence of a prediction of future event D from associative memory A, a new inter-event interval between event A and event B is +1 since the new occurrence of event B is one time interval after the new occurrence of event A. In this example, the associative memory A has previously observed that the inter-event interval between events A and B was +1. Since the new inter-event interval and the previously observed inter-event interval are the same, then the discount value is 100%, which means the portion of the confidence value 133 that is attributable to the A, B, D association is the same as the experience value 131, which is 2.

Regarding the A, C, D triple association, a new inter-event interval between event A and event C is +2 since the new occurrence of event C is two time intervals after the new occurrence of event A. In this example, the associative memory A has previously observed that the inter-event interval between events A and C was +3. The discount factor corresponding to event C may be determined as the ratio of the new inter-event interval and the previously observed inter-event interval which is 66%. In this regard, the portion of the confidence value 133 that is attributable to the A, C, D association is the product of the discount value (66%) and the experience value 131 (1), which is 0.66. The confidence value 133 portions from all sources in the associative memory may be summed to generate a confidence value 133 of 2.66. Thus, associative memory A predicts that future event D will occur four time intervals after the occurrence of event A, or at time interval T6, with a confidence value 133 of 2.66.

Associative memory B performs similar imagine operations as those described above regarding associative memory A and predicts that future event D will occur three time intervals after event B, or at time interval T6. Regarding the confidence value 133, the experience value 131 corresponding to the A-B inter-event interval is not discounted (100%) and the experience value 131 corresponding to the B-C inter-event interval is discounted at 50%. Accordingly, associative memory B predicts that event D will occur three time intervals after the new occurrence of event B, which is time interval T6 with a 2.5 confidence value.

Similarly, the imagine operation of associative memory C predicts that future event D will occur one inter-event interval after event C, which is time interval T5 with a confidence value 133 of 1.16. In some embodiments, the predictions of associative memories A and B may be summed or otherwise aggregated to provide a summary confidence value 133 that corresponds to the prediction that future event D will occur at time interval T6.

In contrast with simple linear lag model, the associative memory learns temporal causality in terms of contexts. Absent a context, the associative memory may not make meaningful observations. For example, reference is briefly made to FIG. 8, which illustrates observations of events and inter-event intervals without a context corresponding to Series 6 of FIG. 2 according to exemplary embodiments of the invention. As illustrated, interest event D 123 occurs four time intervals after event A occurs. However, since there are no other event contexts in which to observe the series, none of the memories A, B, C, or D make any observations. In this regard, no learning may occur as a result of this sequence.

In some embodiments, an observe operation in an associative memory may loosely correlate to a write operation and an imagine operation in an associative memory may loosely correlate to a read operation.

Figure 9:
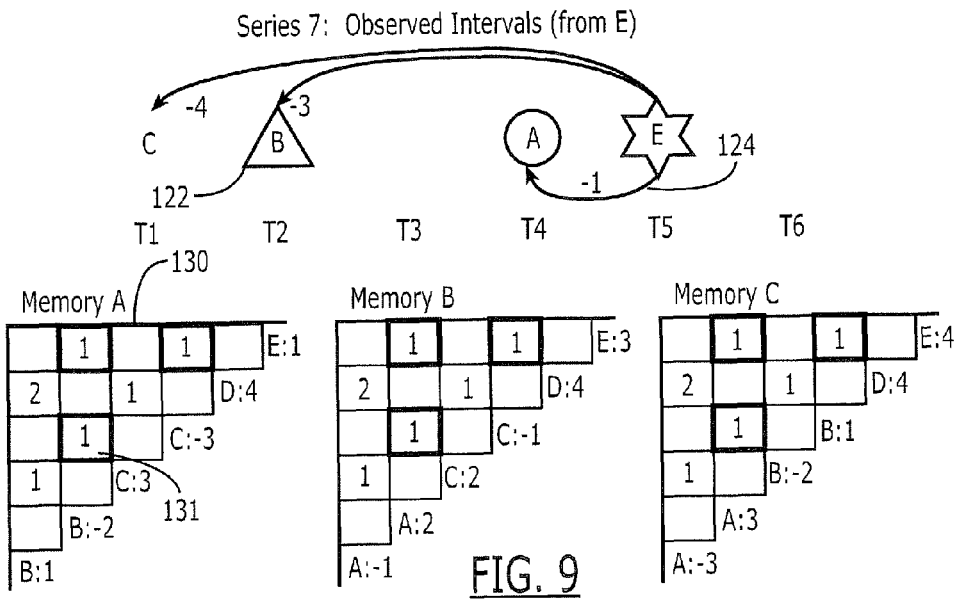
FIG. 9 illustrates observations of events and inter-event intervals corresponding to Series 7 of FIG. 2 according to exemplary embodiments of the invention.

Reference is now made to FIG. 9, which illustrates observations of events and inter-event intervals corresponding to Series 7 of FIG. 2 according to exemplary embodiments of the invention. As additional event types and/or inter-event intervals among existing event types are observed, the associative memories may increase in size, complexity and/or sparsity of matrix population. For example, observations of Series 7 of FIG. 2 by associative memories A, B and C increase the number of memorized triple associations within each of the associative memories to include the newly observed series. Although not illustrated here for simplicity, an associative memory corresponding to event E may also be generated and/or populated via observe operations.

Figure 10:
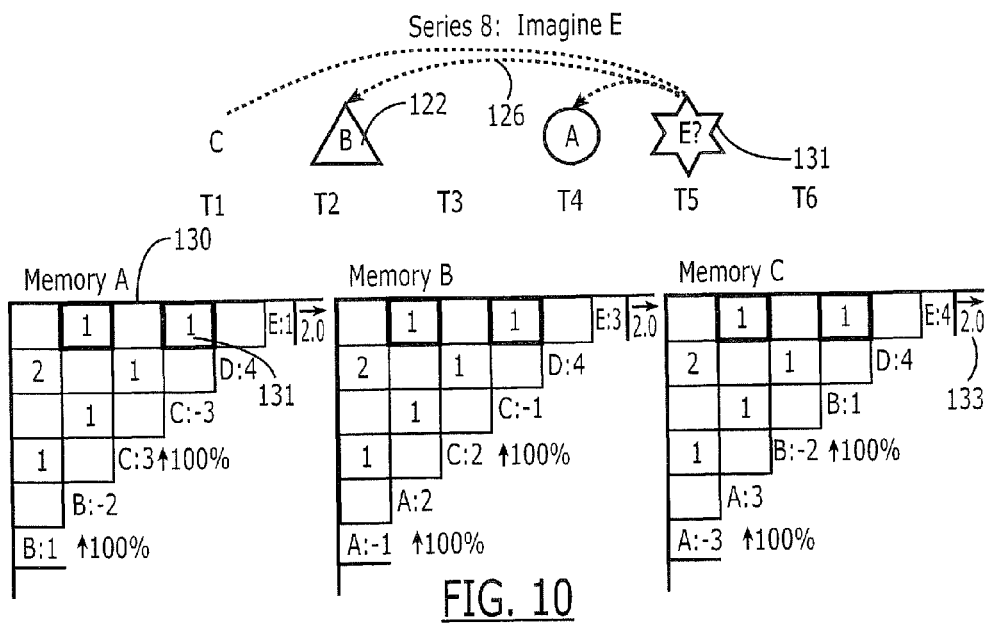
FIGS. 10-11 illustrate imagine operations regarding events and inter-event intervals corresponding to Series 8-9 of FIG. 2 according to exemplary embodiments of the invention.
Figure 11:
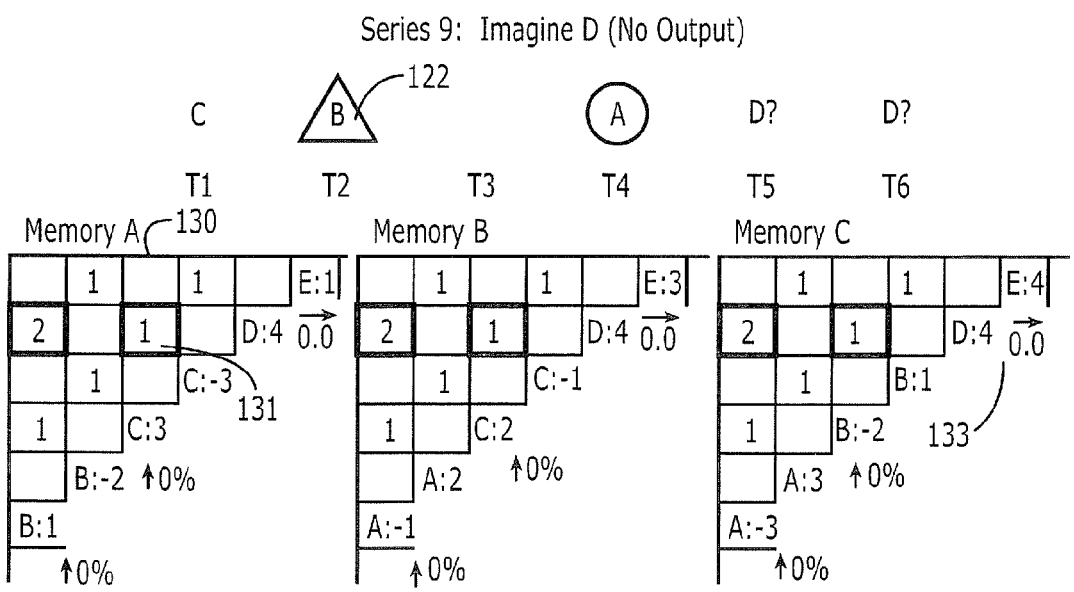

Reference is now made to FIGS. 10-11, which illustrate imagine operations regarding events and inter-event intervals corresponding to Series 8-9 of FIG. 2 according to exemplary embodiments of the invention. Referring to FIG. 10, note that the new occurrences of events C. B and A, respectively, include identical inter-event intervals as those observed in Series 7. In this regard, the memorized inter-event intervals are the same as the new inter-event intervals and thus the discount values are all 100%. In this regard, for example, associative memory A includes an experience value 131 of one that event E occurs one time interval after event A when event B occurs two intervals before event A. Additionally, associative memory A includes an experience value 131 of 1 that event E occurs one time interval after event A when event C occurs three intervals before event A.

Regarding the confidence value 133, the experience values 131 corresponding to the A-B inter-event interval and the A-C inter-event interval are not discounted (100%). Accordingly, associative memory A predicts that event E will occur one time interval after the new occurrence of event A, which is time interval T5 with a 2.0 confidence value. Imagine operations of associative memories B and C regarding a future occurrence of event E also each predict that E will occur at time interval T5 with respective confidence values 133 of 2.0.

Reference is now made to FIG. 11, which illustrates an imagine operation corresponding to imagining a future occurrence of event D responsive to new occurrences of events A, B and C in Series 9 of FIG. 2. Associative memory A includes experience values 131 such that event D occurred four time intervals after event A when event B occurred one time interval after event A and when event C occurred three times after event A.

Regarding the A, B, D portion of the prediction of associative memory A, a new inter-event interval between event A and event B is −2 since the new occurrence of event B is two time intervals before the new occurrence of event A. In this example, the associative memory A has previously observed that the inter-event interval between events A and B was +1. The discount factor corresponding to event B may be determined as the ratio of the new inter-event interval and the previously observed inter-event interval which is −0.50. Note that the ratio is less than zero because the new sequence in which events A and B occurred is opposite that of the memorized association between events A and B. In this circumstance, the confidence value 133 may be considered to include a minimum value of zero. In this regard, the portion of the confidence value 133 that is attributable to the A, B, D association is the product of the discount value (0%) and the experience value 131 (2), which is 0.

Additionally, the A, C, D portion of the prediction of associative memory A is also zero due to a negative inter-event interval ratio and thus a zero confidence value. Similarly, imagine operations of associative memories B and C produce the same lack of predictions regarding a future occurrence of event D for the same reasons as associative memory A.

Figure 12:
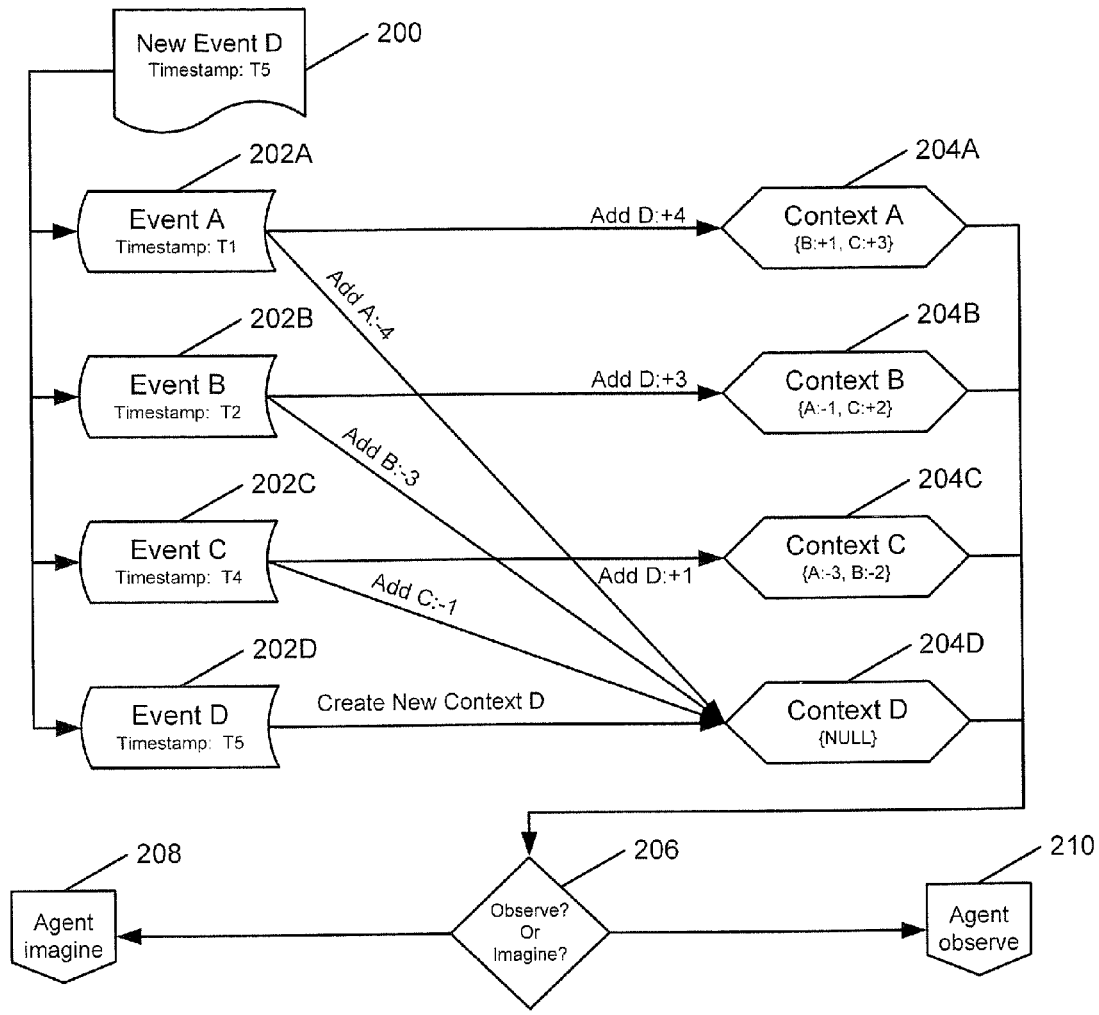
FIG. 12 is a block diagram that illustrates an observation triggering event and the context update corresponding to generating a short term associative memory responsive to the triggering event according to some embodiments of the invention.

Reference is now made to FIG. 12, which is a block diagram that illustrates an observation triggering event and the context update corresponding to generating a short term associative memory responsive to the triggering event according to some embodiments of the invention. Events A, B, and C 202A-C occur at timestamps T1, T2, and T4, respectively. The persistence of events A, B, and C 202A-C and their respective timestamps may be preserved via temporary storage. Records of the events 202A-C and their timestamps may be maintained until a subsequent event triggers the translation of the event:timestamp data into event:inter-event interval data, which may be stored in short term memory as contexts 204A-D that are specific to each of the respective events 202A-C. When a subsequently occurring new event D 200 occurs, each of the existing contexts is updated with the event:inter-event interval data corresponding to new event D 200. Additionally, a new context D 204D is created and is populated with the events and corresponding inter-event intervals of the existing events 202A-C.

The contexts 204A-D may be used to observe a series of events or imagine a future outcome (block 206) by predicting a future occurrence of an event and/or type of event. Notice that any single memory's representation generally is insufficient to provide accurate representation of the temporal causality of the series of events. Instead, the representation may be distributed across multiple associative memories.

In an associative memory implementation, according to some embodiments of the present invention, this notation may be embodied as a set of agents, each observing a context, containing a list of events and corresponding inter-event intervals and experience values providing triple associations therewith. In some embodiments, an agent may represent an associative memory as described above in FIG. 1. For the representation of temporal causalities, each experience value 131 is a representational encoding of each triple association of events and their inter-event intervals. In other words, the context for each agent is the list of event:inter-event intervals—from its perspective.

Each agent may observe its context, representing its perspective of each series of events, and store the event:inter-event interval associations in its memory (block 210). This provides a representation of the triple associations. In anthropomorphic terms, it is as if Agent A remembers that when B occurs 1 time interval away, then C tends to occur 2 time intervals away. In this manner, each agent forms or updates its associative memory to account for the new events and persistence its new memory in a file base of database for future updates or predictions.

An agent may also perform an imagine operation (block 208). Assuming the preparation of contexts to represent each event-agent perspective, each agent is given its context and may be called—conditional to the events and inter-event intervals—to imagine specific events and/or event types and their likely inter-event intervals. All the predictions are collated for each predicted future event occurrence and from the set of given object-agents, the event type and likely time intervals. In some embodiments, the agents may also provide confidence values corresponding to their respective predictions. The collated predictions may be processed to provide an anticipated time of future occurrence of the predicted event.

Figure 13:
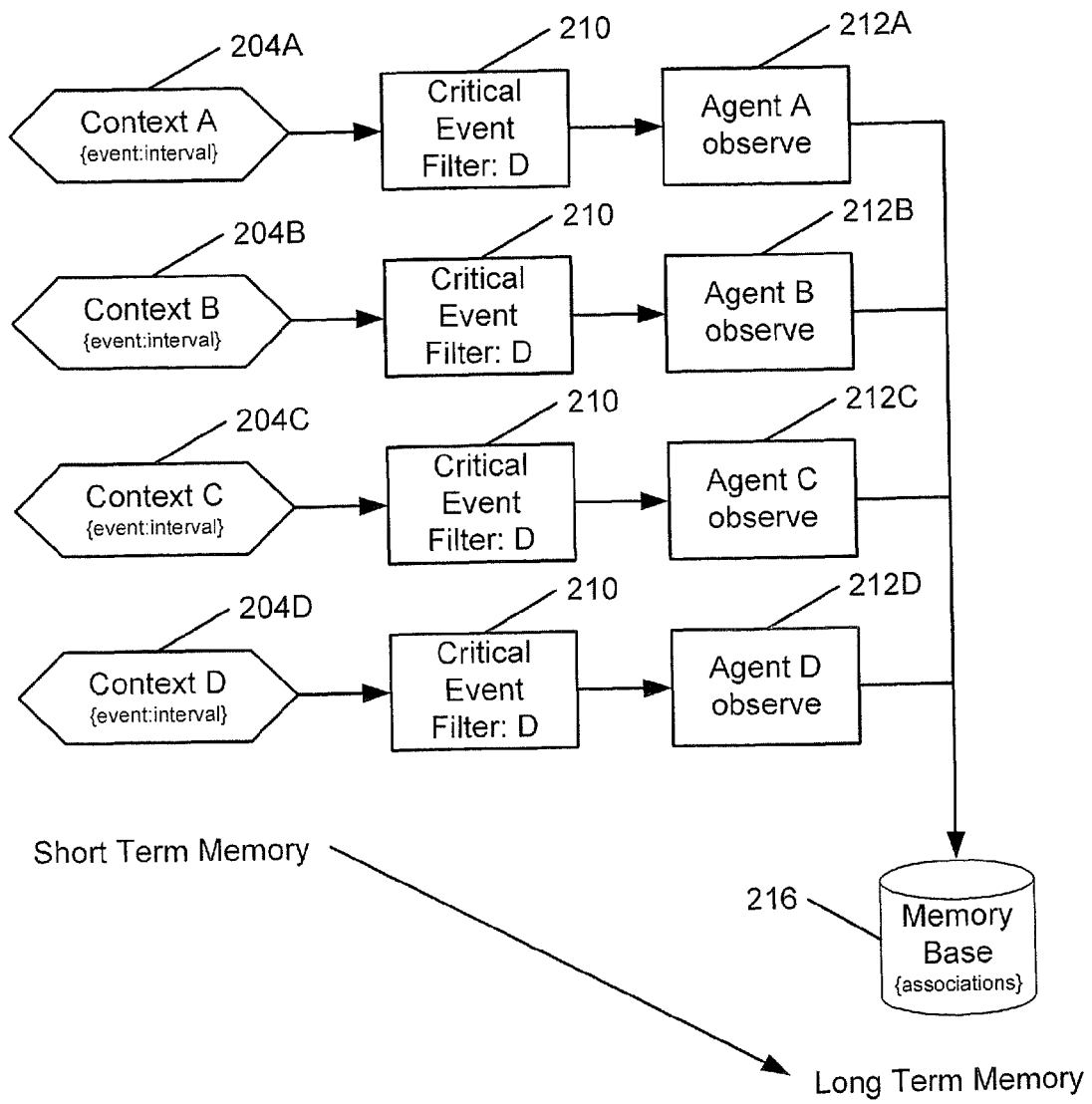
FIG. 13 is a block diagram that illustrates observation operations corresponding to updating long term agent memory with short term event context data according to some embodiments of the invention.

Brief reference is now made to FIG. 13, which is a block diagram that illustrates observation operations corresponding to updating long term agent memory with short term event context data according to some embodiments of the invention. As discussed above regarding FIG. 12, the event:inter-event interval data is stored in a short term memory as contexts 204A-D. A critical event filter 210 may be provided to determine events that may trigger the observe process 212A-D of the event:inter-event interval data into a memory base 216 for long term memory. For example, a critical event filter 210 may provide that an interest event, such as, event D may trigger the respective agents to observe the event:inter-event interval data into the long term memory.

Figure 14:
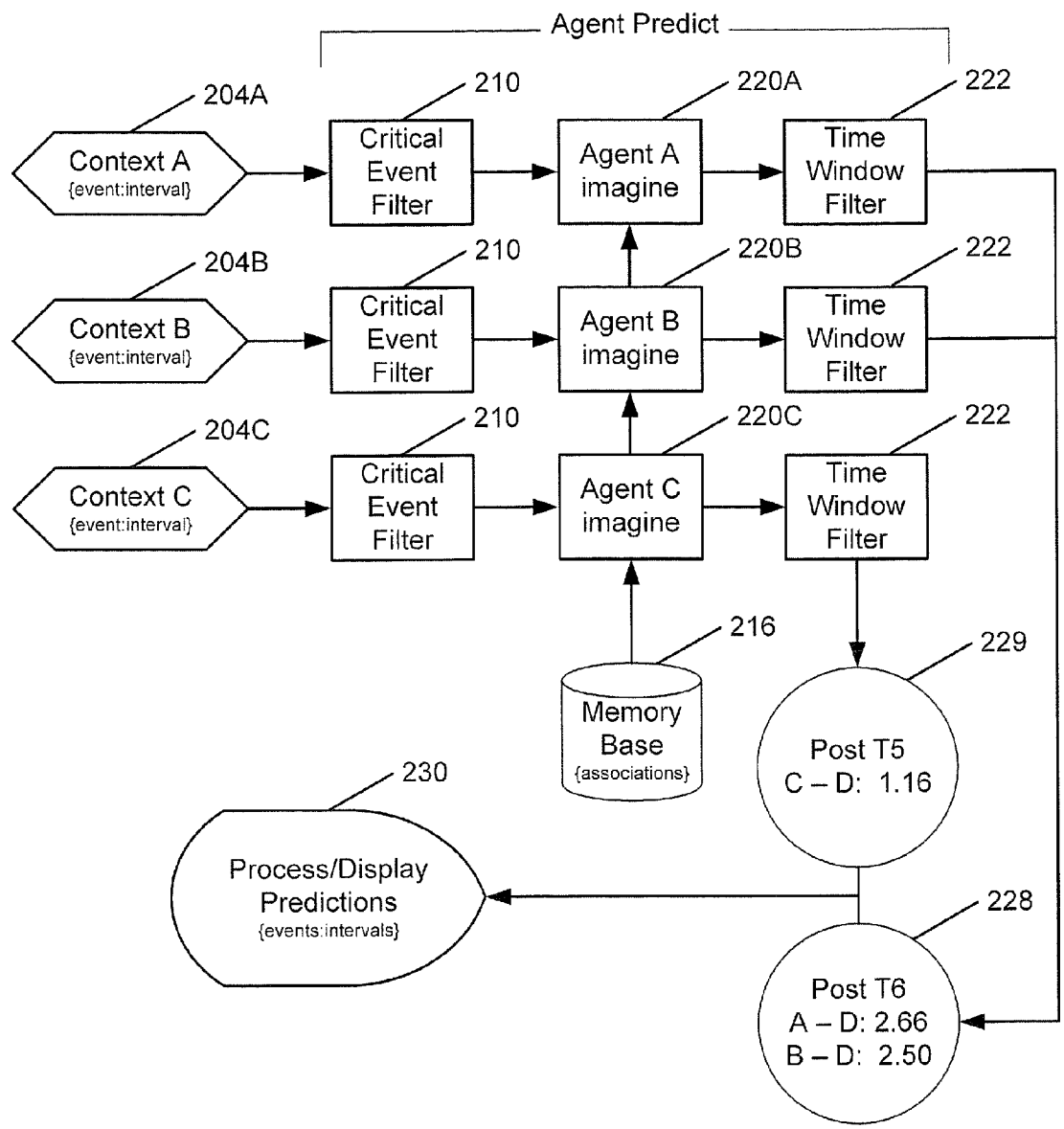
FIG. 14 is a block diagram that illustrates imagine operations that may generate predictions and process/display operations performed on the predictions to anticipate a future occurrence of an interest event according to some embodiments of the invention.

Reference is now made to FIG. 14, which is a block diagram that illustrates imagine operations that may generate predictions and process/display operations performed on the predictions to anticipate a future occurrence of an interest event according to some embodiments of the invention. Some embodiments provide that contexts 204A-C corresponding to new occurrences of events and/or event types A, B and C may be used as a basis and/or trigger to anticipate a future time of occurrence of an interest event. A critical event filter 210 may be provided to define which event and/or event type(s) for which a future time of occurrence will be predicted. The agents may perform an imagine operation 220A-C corresponding to a time of future occurrence the event(s) defined in the critical event filter 210 using the contexts 204A-C and the agent's long term memory as stored in the memory base 216.

In some embodiments, a time window filter 222 may be applied to the predictions from the agent imagine operations to increase the relevance of the predictions relative to one another. For example, predictions beyond a predefined number of inter-event intervals and/or time intervals may be of reduced value and/or interest.

The filtered predictions may be posted corresponding to, for example, specific time intervals 228, 229. For example, using the example discussed above regarding FIG. 7, the prediction by agent C that event D will occur in time interval T5 may be posted 229 and may include the confidence factor 1.16. Similarly, the prediction by agents A and B that event D will occur in time interval T6 may be posted 228 and may include the respective confidence factors 2.66 and 2.50. The predictions may then be processed and/or displayed 230.

Figure 15:
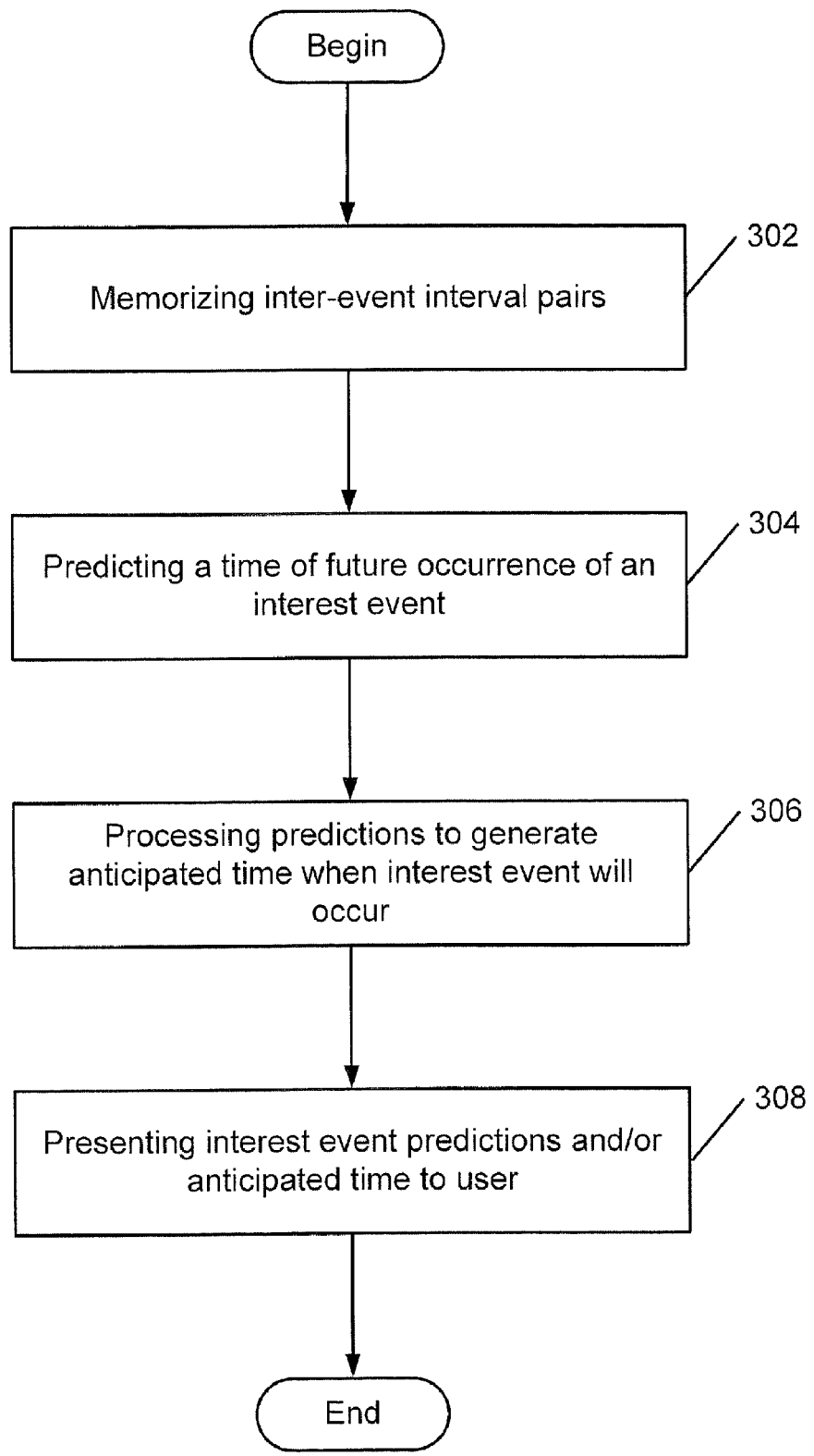
FIG. 15 is a flowchart of operations that may be performed for anticipating a time of future occurrence of an interest event according to exemplary embodiments of the invention.

Reference is now made to FIG. 15, which is a flowchart of operations that may be performed for anticipating a time of future occurrence of an interest event according to exemplary embodiments of the invention. An operational flow according to embodiments of the present invention can reuse much of the representational processes described above. For a respective event of multiple events, inter-event interval pairs corresponding to occurrence times of other of the events may be memorized (block 302). In some embodiments, memorizing the inter-event interval pairs includes memorizing triple associations between the respective event and respective pairs of remaining events. Some embodiments provide that the triple associations include an association that the respective event occurred a first inter-event interval from a first event of the remaining events when the respective event occurred a second inter-event interval from a second event of the remaining events. Some embodiments provide that memorizing the inter-event interval pairs is performed by an associative memory corresponding to the respective event.

Operations may include, for a respective event, predicting a time of future occurrence of an interest event from the respective event based on inter-event intervals that have been memorized and based on a new occurrence of at least one of the events (block 304). In some embodiments, multiple interest event predictions may be obtained corresponding to multiple events. Some embodiments provide that predicting the time of future occurrence of the interest event includes generating a predicted inter-event interval between the respective event and the future occurrence of the interest event based on ones of the inter-event interval pairs corresponding to the respective event and at least one of the events that were memorized in a respective associative memory.

In some embodiments, predicting may also include generating a confidence value that corresponds to the predicted inter-event interval and that is based on at least one experience value corresponding to the inter-event interval pairs that have been memorized. Some embodiments provide that generating the confidence value includes comparing a range that is based on the memorized inter-event interval corresponding to the respective event and at least one of the memorized events with a value of a new inter-event interval corresponding to the new occurrence of the respective event and the new occurrence of the at least one memorized events. In some embodiments, the confidence value may be generated by dividing the new inter-event interval by the value corresponding to the range that is based on the memorized inter-event interval between the respective event and the at least one memorized event. Some embodiments provide that if the result of the division is greater than one, then the reciprocal of the result provides the confidence value. In this manner, the confidence value is within a range between zero and one.

Operations according to some embodiments may include processing the predictions to generate an anticipated time when the interest event will occur in the future (block 306). In some embodiments, processing the predictions includes aggregating ones of the confidence values of the predictions corresponding to each of the predicted time intervals.

Some embodiments provide that operations include presenting interest event predictions and/or anticipated time of future occurrence of the interest event to a user (block 308). In some embodiments, presenting the data to a user may include generating display and/or output data that may be stored in a display file and/or output via a data output device such as a computer display and/or printed media.

Figure 16:
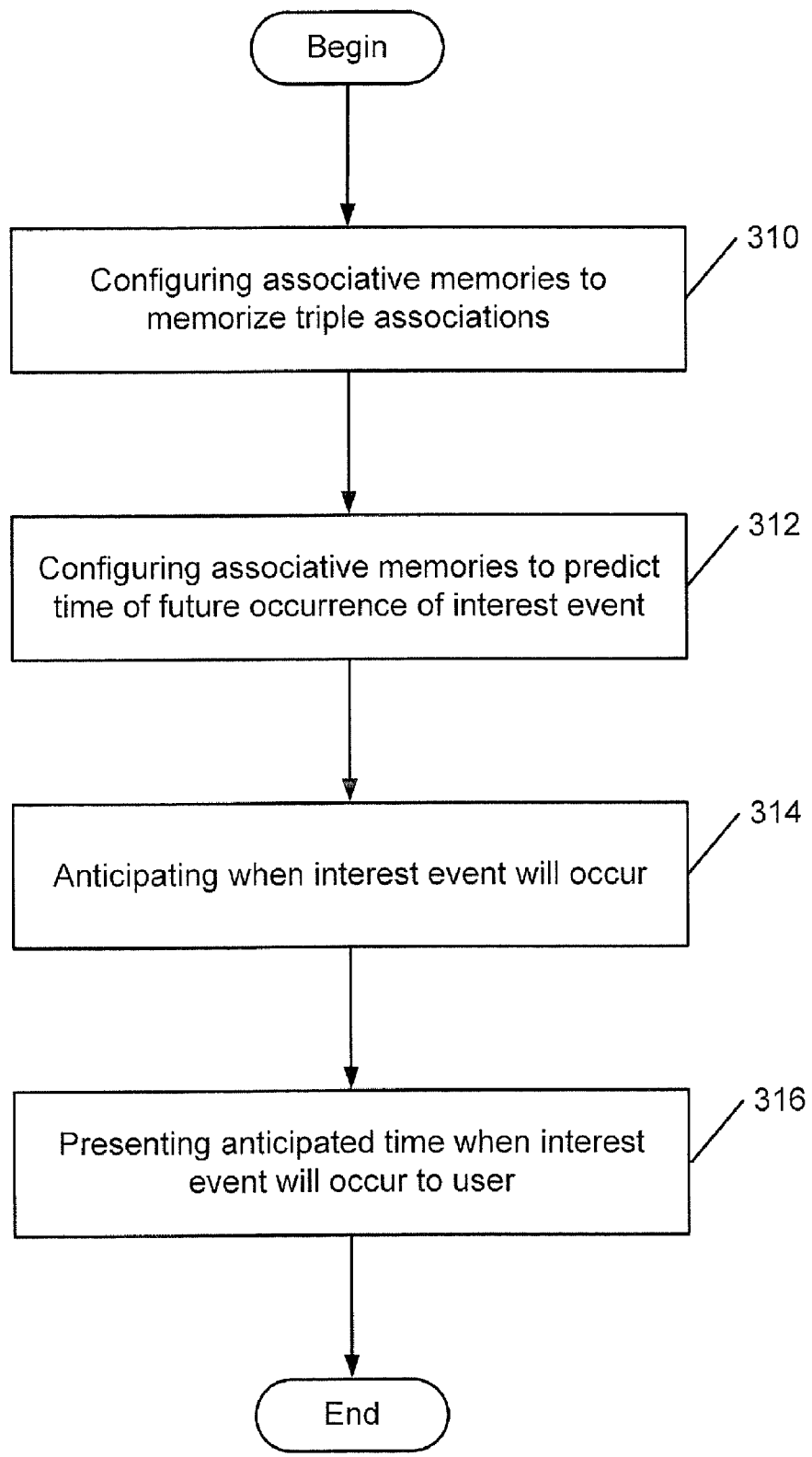
FIG. 16 is a flowchart of operations that may be performed for anticipating a time of future occurrence of an interest event according to exemplary embodiments of the invention.

Reference is now made to FIG. 16, which is a flowchart of operations that may be performed for anticipating a time of future occurrence of an interest event according to exemplary embodiments of the invention. Some embodiments provide that operations may include configuring multiple associative memories to memorize triple associations between a respective event and at least two of multiple previously occurring events (block 310). In some embodiments, a triple association may include an association that the respective event occurred a first inter-event interval from a first event and a second inter-event interval from a second event.

Operations may include configuring associative memories to predict a time of future occurrence of an interest event relative to the respective event based on the memorized triple associations and a new occurrence of at least one event (block 312). In some embodiments, configuring the respective associative memory to predict the time of future occurrence may include configuring a respective associative memory to generate a predicted inter-event interval between the respective event and the future occurrence of the interest event based on ones of the triple associations and to generate a confidence value corresponding to the predicted inter-event interval. Some embodiments provide that the association may be based on an experience value in the associative memory that corresponds to the triple associations that have been memorized.

Operations may include anticipating when the interest event will occur by processing predicted times of future occurrence of the interest event that were generated by the associative memories (block 314). In some embodiments, anticipating include sorting the predicted times of future occurrence according to future time intervals and summing multiple confidence values that correspond to the predicted times of future occurrence within each of the future time intervals. In this manner, each future time interval may include an aggregate confidence value and thus the predicted time intervals can be compared to determine which one or ones provide the greatest degree of confidence.

In some embodiments, operations may include presenting, to a user, an anticipated future time that the interest event will occur (block 316). In some embodiments, presenting the data to a user may include generating display and/or output data that may be stored in a display file and/or output via a data output device such as a computer display and/or printed media.

An event-based representation according to some embodiments of the present invention can be temporally invariant by virtue of the use of inter-event intervals. Scale invariance could also be added by normalization of time intervals. This is in contrast to the potential cost and/or inflexibility of other "invariant" approaches.

Graceful generalization can be intrinsic rather than extrinsic according to some embodiments of the present invention. Aside from recognizing the normal variability of event series (the "springiness" of temporal relationships that might be expected from natural events), such generalization also provides a form of temporal invariance.

Greater precision and accuracy should also be possible by the inclusion of other temporal data, according to some embodiments of the present invention. Thus, embodiments of the invention also may be suited to correlate any number of dependent/independent variables within one or many memories.

Embodiments of the invention may be scaled in space and/or time. In some embodiments, single memories of over a million attributes, among over a million agents making over a million observations may be provided using only standard desktop computers. Scalar generalization also may be provided according to some embodiments of the present invention, to respect the scalar semantics of numbers in terms of range, resolution, and difference.

Unlike statistical methods in general, embodiments of the invention can provide quick, non-parametric, and incremental approaches to machine learning. Beyond single agent learning, embodiments of the invention can also demonstrate the power of distributed learning as a network of networks. Beyond mere correlation, the power of distributed, networked memories can allow for representation of semantic triples, commonly known as semantic graphs. For instance, embodiments of the invention can learn about event co-mentions in transactions and text.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of anticipating a time of occurrence of an interest event of a plurality of events based on time intervals between at least two previously occurring events of the plurality of events and a previous occurrence of the interest event and based on a new occurrence of at least one of the plurality of events, the method comprising:
  for a respective event of the plurality of events, memorizing a plurality of inter-event interval pairs based on occurrence times of pairs of respective remaining events relative to an occurrence time of the respective event;
  for a respective event of the plurality of events, predicting a time of future occurrence of the interest event from the respective event based on the inter-event interval pairs that have been memorized and based on the new occurrence of the respective event and at least one of the plurality of events to obtain a plurality of interest event predictions of times of future occurrences of the interest event;
  processing the plurality of predictions to generate an anticipated time when the interest event will occur in the future; and
  presenting, to a user, at least one of the plurality of interest event predictions and/or the anticipated time when the interest event will occur in the future,
  wherein at least one of memorizing, predicting, processing and presenting is performed using at least one processor.

2. A method according to claim 1, wherein memorizing the plurality of inter-event interval pairs based on the occurrence times of pairs of respective remaining events relative to the occurrence time of the respective event comprises memorizing a plurality of triple associations between the respective event and respective pairs of remaining events.

3. A method according to claim 2, wherein respective ones of the plurality of triple associations comprise an association that the respective event occurred a first inter-event interval from a first event of the plurality of events when the respective event occurred a second inter-event interval from a second event of the plurality of events.

4. A method according to claim 1, wherein predicting a time of future occurrence of the interest event from the respective event based on the inter-event interval pairs that have been memorized and based on the new occurrence of the respective event and at least one of the plurality of events to obtain a plurality of interest event predictions of times of future occurrences of the interest event comprises:

generating a predicted inter-event interval between the respective event and the future occurrence of the interest event based on ones of the plurality of inter-event interval pairs corresponding to the respective event and the at least one of the plurality of events that were memorized in a respective associative memory for the respective event; and generating a confidence value that corresponds to the predicted inter-event interval and that is based on an experience value corresponding to the inter-event interval pairs that have been memorized.

5. A method according to claim 4, wherein generating the confidence value comprises comparing a range that is based on the memorized inter-event interval corresponding to the respective event and the at least one of the plurality of events with a value of a new inter-event interval corresponding to the new occurrence of the respective event and the new occurrence of the at least one of the plurality of events.

6. A method according to claim 5, wherein generating the confidence value comprises:

dividing the new inter-event interval by the range that is based on the memorized inter-event interval corresponding to the respective event and the at least one of the plurality of events; and if a result of the dividing is greater than 1, generating a reciprocal of the result to generate the confidence value.

7. A method according to claim 5, wherein the range includes a first endpoint that corresponds to the greatest absolute value of the either the memorized inter-event interval corresponding to the respective event and the at least one of the plurality of events or the new inter-event interval, wherein the range includes a second endpoint that is zero if both of the memorized inter-event intervals corresponding to the respective event and the at least one of the plurality of events or the new inter-event interval are either positive numbers or negative values, and wherein the range includes the second endpoint that is the other of the memorized inter-event interval corresponding to the respective event and the at least one of the plurality of events or the new inter-event interval if only one of the memorized inter-event interval corresponding to the respective event and the at least one of the plurality of events or the new inter-event interval are a positive or negative value.

8. A method according to claim 1 wherein memorizing the plurality of inter-event interval pairs based on the occurrence times of pairs of respective remaining events relative to the occurrence time of the respective event is performed by a respective associative memory for the respective event.

9. A method according to claim 1, wherein processing the plurality of predictions to generate the anticipated time when the interest event will occur in the future comprises summing ones of the confidence values corresponding to the plurality of predictions at each of the times of future occurrence.

10. A computer program product comprising a computer usable storage medium having computer-readable program code embodied in the medium, the computer-readable program code configured to perform the method of claim 1.

11. A computer system comprising means for performing the method of claim 1.

12. A system for anticipating a time of future occurrence of an interest event of a plurality of events, the system comprising:

a plurality of associative memories, a respective one of which is configured to memorize a plurality of triple associations between a respective event and at least one of a previously occurring plurality of events, a respective associative memory also being configured to predict a time of future occurrence of the interest event relative to the respective event based on the memorized plurality of triple associations and a new occurrence of at least one of the plurality of events;

an anticipation module that is operable to anticipate when the interest event will occur by processing a plurality of predicted times of future occurrence of the interest event corresponding to the plurality of associative memories; and an output generator that is operable to generate an output for a user that corresponds to an anticipated time when the interest event will occur in the future.

13. A system according to claim 12, wherein a respective associative memory is configured to memorize the plurality of triple associations between a respective event and at least one of a previously occurring plurality of events by memorizing each time a first event of the plurality of events having a first inter-event interval from the respective event occurs when a second event of the plurality of events having a second inter-event interval from the respective event occurs.

14. A system according to claim 12, wherein a respective associative memory is configured to predict a time of future occurrence of the interest event relative to the respective event based on the memorized plurality of triple associations and the new occurrence of at least one of the plurality of events, by generating a predicted inter-event interval between the respective event and the future occurrence of the interest event and by generating a confidence value that corresponds to the predicted inter-event interval and that is based on an experience value corresponding to the plurality of triple associations that have been memorized.

15. A system according to claim 14, wherein a respective associative memory is configured to generate the confidence value by comparing a first inter-event interval between the respective event and the at least one of the previously occurring plurality of events and a second inter-event interval between the respective event and the new occurrence of the at least one of the plurality of events.

16. A system according to claim 12, wherein the anticipation module is further operable to combine respective ones of the plurality of predicted times of future events that are predicted to occur in the same time interval by aggregating the confidence values thereof.

17. A computer program product comprising a computer usable storage medium having computer-readable program code embodied in the medium, the computer-readable program code configured to provide the system of claim 12.

18. A method for anticipating a time of future occurrence of an interest event of a plurality of events, comprising:

configuring a respective one of a plurality of associative memories to memorize a plurality of triple associations between a respective event and at least two of a previously occurring plurality of events;

configuring a respective one of the plurality of associative memories to predict a time of future occurrence of the interest event relative to the respective event based on the memorized plurality of triple associations and a new occurrence of at least one of the plurality of events;

anticipating when the interest event will occur by processing a plurality of predicted times of future occurrence of the interest event corresponding to the plurality of associative memories; and presenting, to a user, an anticipated time when the interest event will occur in the future.

19. A method according to claim 18, wherein a respective one of the plurality of triple associations comprises an association that the respective event occurred a first inter-event interval from a first event of the plurality of events when the respective event occurred a second inter-event interval from a second event of the plurality of events.

20. A method according to claim 18, wherein configuring a respective one of the plurality of associative memories to predict a time of future occurrence of the interest event relative to the respective event based on the memorized plurality of triple associations and a new occurrence of at least one of the plurality of events comprises:

configuring a respective one of the plurality of associative memories to generate a predicted inter-event interval between the respective event and the future occurrence of the interest event based on ones of the plurality of triple associations corresponding to the respective event and the at least one of the plurality of events that were memorized in a respective associative memory for the respective event; and configuring a respective one of the plurality of associative memories to generate a confidence value that corresponds to the predicted inter-event interval and that is based on an experience value corresponding to the plurality of triple associations that have been memorized.

21. A method according to claim 18, wherein anticipating when the interest event will occur by processing the plurality of predicted times of future occurrence of the interest event corresponding to the plurality of associative memories comprises:

sorting the plurality of predicted times of future occurrence of the interest event according to future time intervals; and summing a plurality of confidence values corresponding to respective ones of the plurality of predicted times of future occurrence within each of the predicted time intervals.

22. A computer program product comprising a computer usable storage medium having computer-readable program code embodied in the medium, the computer-readable program code configured to perform the method of claim 18.

* * * * *